(12) United States Patent
Morein

(10) Patent No.: US 11,145,277 B2
(45) Date of Patent: *Oct. 12, 2021

(54) DISPLAY INTERFACE WITH FOVEAL COMPRESSION

(71) Applicant: Synaptics Incorporated, San Jose, CA (US)

(72) Inventor: Stephen L. Morein, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,966

(22) Filed: Apr. 23, 2020

(65) Prior Publication Data

US 2020/0258482 A1 Aug. 13, 2020

Related U.S. Application Data

(63) Continuation of application No. 15/781,077, filed as application No. PCT/US2018/033551 on May 18, 2018, now Pat. No. 10,665,209.

(60) Provisional application No. 62/508,240, filed on May 18, 2017.

(51) Int. Cl.
*G09G 5/391* (2006.01)
*G09G 5/00* (2006.01)
*G09G 5/377* (2006.01)
*H04N 13/344* (2018.01)
(Continued)

(52) U.S. Cl.
CPC ........... *G09G 5/391* (2013.01); *G02B 27/017* (2013.01); *G09G 5/006* (2013.01); *G09G 5/377* (2013.01); *H04N 13/344* (2018.05);
*H04N 13/383* (2018.05); *G02B 2027/0147* (2013.01); *G02B 2027/0187* (2013.01); *G09G 2340/0407* (2013.01); *G09G 2340/10* (2013.01);
(Continued)

(58) Field of Classification Search
None
See application file for complete search history.

(56) References Cited

U.S. PATENT DOCUMENTS

2004/0003409 A1* 1/2004 Berstis ............... H04N 21/2187
725/105
2006/0238486 A1* 10/2006 Hiraki ................. G09G 3/3666
345/102

(Continued)

OTHER PUBLICATIONS

International Search Report and Written Opinion, dated Nov. 9, 2018, from Intl. Application No. PCT/US2018/033551 (21 pages).

*Primary Examiner* — Michelle Chin
(74) *Attorney, Agent, or Firm* — Paradice & Li LLP

(57) ABSTRACT

A method of transporting foveal image data is disclosed. A host device receives image data from an image source and renders a full field-of-view (FFOV) image using the image data. The host device further identifies a foveal region of the FFOV image and renders a foveal image corresponding to the foveal region using the image data. More specifically, the foveal image may have a higher resolution than the foveal region of the FFOV image. The host device may then transmit each of the foveal image and the FFOV image, in its entirety, to a display device. For example, the host device may concatenate the foveal image with the FFOV image to produce a frame buffer image, and then transmit the frame buffer image to the display device.

12 Claims, 12 Drawing Sheets

(51) Int. Cl.
 *H04N 13/383* (2018.01)
 *G02B 27/01* (2006.01)
(52) U.S. Cl.
 CPC ..... *G09G 2340/12* (2013.01); *G09G 2354/00* (2013.01); *G09G 2360/18* (2013.01)

(56) References Cited

U.S. PATENT DOCUMENTS

| | | | |
|---|---|---|---|
| 2014/0184475 A1* | 7/2014 | Tantos | H03M 13/356 345/8 |
| 2014/0361977 A1 | 12/2014 | Stafford et al. | |
| 2016/0240013 A1* | 8/2016 | Spitzer | G02B 27/0179 |
| 2016/0241800 A1* | 8/2016 | Shin | H04N 5/2173 |
| 2016/0267715 A1* | 9/2016 | Patel | G06F 3/013 |
| 2016/0323561 A1 | 11/2016 | Jin et al. | |
| 2016/0373722 A1 | 12/2016 | Mishra et al. | |
| 2017/0018232 A1* | 1/2017 | Nicholson | G09G 3/3406 |
| 2018/0261003 A1* | 9/2018 | Peli | G06T 15/08 |
| 2019/0278090 A1* | 9/2019 | Yehezkel | G06F 3/017 |

\* cited by examiner

DISPLAY INTERFACE WITH FOVEAL COMPRESSION

CROSS-REFERENCE TO RELATED APPLICATIONS

The present application is a Continuation of U.S. application Ser. No. 15/781,077, filed Jun. 1, 2018 entitled "DISPLAY INTERFACE WITH FOVEAL COMPRESSION," which is a U.S. National Stage under 35 U.S.C. § 371 of International Application No. PCT/US2018/033551 filed May 18, 2018 entitled "DISPLAY INTERFACE WITH FOVEAL COMPRESSION," which claims benefit of priority to U.S. Provisional Patent Application No. 62/508,240 filed May 18, 2017 entitled "DISPLAY INTERFACE WITH FOVEAL COMPRESSION," the entire contents of which are incorporated herein by reference.

TECHNICAL FIELD

The present embodiments relate generally to head-mounted display (HMD) devices, and specifically to a display interface with foveal compression for HMD devices.

BACKGROUND OF RELATED ART

Head-mounted display (HMD) devices are configured to be worn on, or otherwise affixed to, a user's head. An HMD typically comprises one or more displays positioned in front of one, or both, of the user's eyes. The HMD may display images (e.g., still images, sequences of images, and/or videos) from an image source overlaid with information and/or images from the user's surrounding environment (e.g., as captured by a camera), for example, to immerse the user in a virtual world. HMD devices have applications in medical, military, gaming, aviation, engineering, and various other professional and/or entertainment industries.

HMD devices typically communicate with a separate host device. The host device may receive image data from an image source and process or render the image data to be displayed on the HMD device. The host device then transmits the processed image data to the HMD device for display. Accordingly, most (if not all) of the image processing is performed on the host device, while the HMD device simply displays or presents the received images (e.g., from the host device) to the user. This allows for greater power and memory savings on the HMD device.

Because the host device is physically separated from the HMD device, the rate at which the HMD device can display new images to the user is often limited by the bandwidth of the communication medium (e.g., cable) connecting the host device to the HMD device. However, certain applications (e.g., virtual reality) may require very high-resolution images to be transported from the host device to the HMD device at a very high rate (e.g., in response to any movement of the user's head and/or eyes).

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method of transporting foveal image data is disclosed. A host device receives image data from an image source and renders a field-of-view (FOV) image using the image data. The host device further identifies a foveal region of the FOV image and renders a foveal image corresponding to the foveal region using the image data. More specifically, the foveal image may have a higher resolution than the foveal region of the FOV image. The host device may then transmit each of the foveal image and the FOV image, in its entirety, to a display device.

The FOV image may have the same resolution as the foveal image but encompasses a larger display area. In some embodiments, the host device may concatenate the foveal image with the FOV image to produce a frame buffer image, and then transmit the frame buffer image to the display device. Thus, a resolution of the frame buffer image may be different than a display resolution of the display device.

In some embodiments, the host device may determine a coordinate of the foveal region with respect to the FOV region and transmit the coordinate, with the FOV image and the foveal image, to the display device. For example, the host device may encode the coordinate as pixel data in at least one of the FOV image or the foveal image. In some aspects, the host device may encode the coordinate as pixel data in a non-display region of the FOV image. For example, the encoding may comprise a 2-bits per pixel sparse encoding such that each pattern of bits is represented by a different pixel color.

BRIEF DESCRIPTION OF THE DRAWINGS

The present embodiments are illustrated by way of example and are not intended to be limited by the figures of the accompanying drawings.

DETAILED DESCRIPTION

Figure 1:
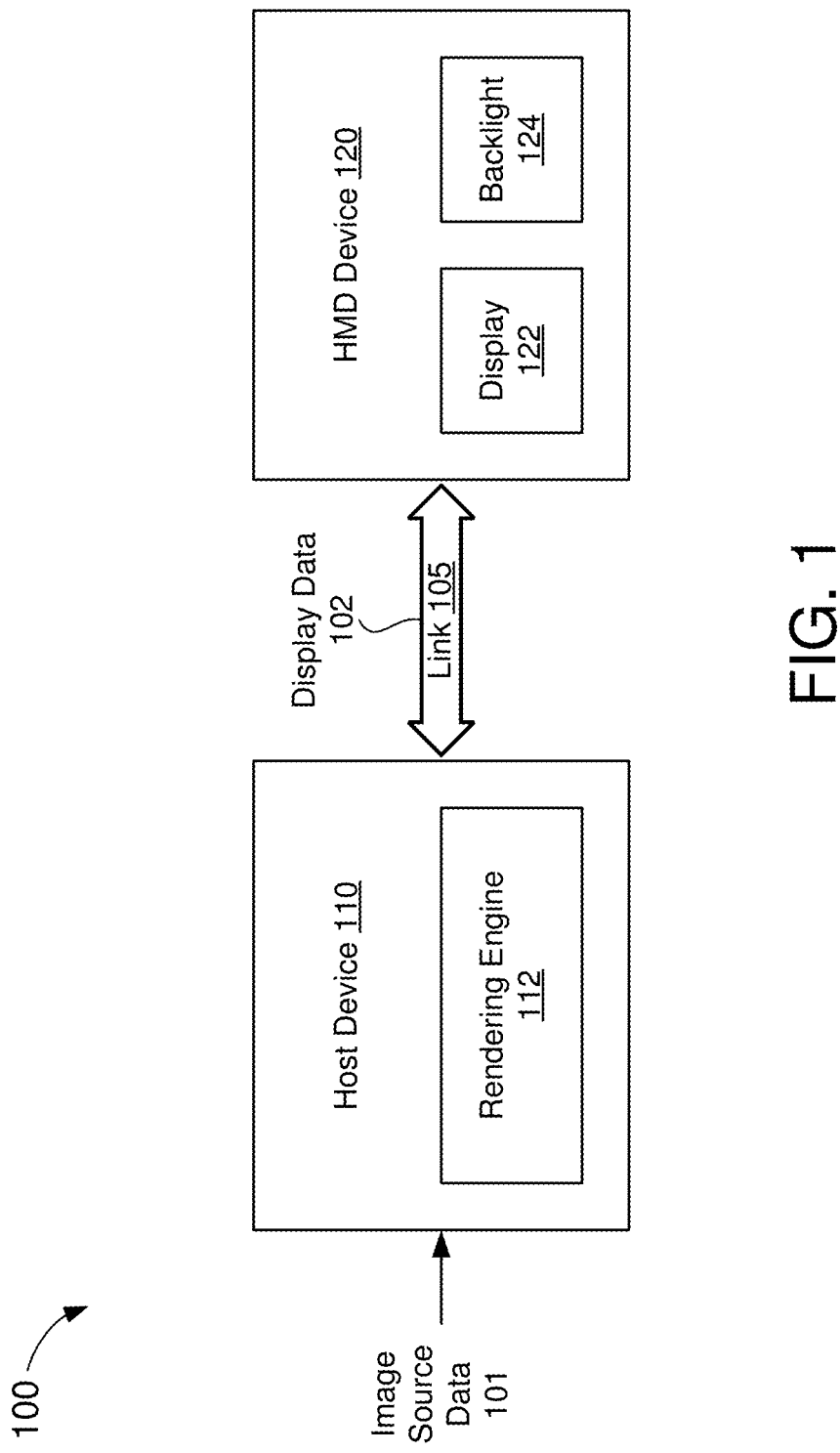
FIG. 1 shows an example display system within which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general purpose processor, conventional processor, controller, microcontroller, and/or state machine capable of executing scripts or instructions of one or more software programs stored in memory. The term "voltage source," as used herein may refer to a direct-current (DC) voltage source, an alternating-current (AC) voltage source, or any other means of creating an electrical potential (such as ground).

Aspects of the present disclosure are directed to a foveal interface for communication between a host device and a head mounted display (HMD) device. The foveal interface includes functionality to transmit a foveal image and a full field of view image. The foveal image has greater resolution than a corresponding (foveal) region of the full field of view image, and, when displayed, is encapsulated in the foveal region of the full field of view image. In the foveal interface, a foveal image is transmitted separate and distinct from the full field of view image. In particular, although the foveal image may be directly adjacent to the field of view image in terms of order of bits transmitted, the foveal image is not encapsulated in the full field of view image when transmitted to the HMD device. Thus, the location of the foveal image with respect to the full field of view image in the transmission does not reflect the actual location of the foveal image with respect to the full field of view image when displayed.

The HMD device upscales the full field of view image. After upscaling the full field of view image, the foveal image is merged with the full field of view image to create the combined image. Thus, the size of the transmission from the host device to the HMD device is reduced (e.g., compared to conventional foveal rendering techniques where the host device generates the combined image and transmits the combined image to the HMD device). By reducing the total transmission size, one or more embodiments provide for a more efficient use of limited bandwidth between the host device and the HMD device.

HMD devices typically have high resolution displays to match the resolution expectations from current display technology. For example, a 3 k by 3 k HMD device with a 120 degree full field of view is equivalent to a 1920×1080 desktop monitor as measured by pixels per degree. Further, in the example, a resolution greater than 6 k by 6 k is used to match the effective resolution of a full high definition (FHD) cellphone. Rendering and transmitting an image larger than 9 megapixels (e.g., 26 megapixels for 6 k by 6 k) at the high frame rate needed for a smooth virtual reality experience may be a challenge. Thus, the foveal interface transmits the foveal image separate from the full field of view image to limit the amount of data transmitted while at the same time complying with the requirements of high resolution displays on HMD devices.

FIG. 1 shows an example display system 100 within which the present embodiments may be implemented. The display system 100 includes a host device 110 and a head-mounted display (HMD) device 120. The host device 110 may be coupled to (and communicate with) components of the HMD device 120 via a communication link 105. The communication link 105 may comprise various wired and/or wireless interconnection and communication technologies, such as buses and networks. Example technologies may include Inter-Integrated Circuit (I²C), Serial Peripheral Interface (SPI), PS/2, Universal Serial bus (USB), Bluetooth®, Infrared Data Association (IrDA), and various radio frequency (RF) communication protocols defined by the IEEE 802.11 standard. In the example of FIG. 1, the host device 110 and HMD device 120 are shown as separate pieces of equipment. However, in actual implementations, the host device 110 and the HMD device 120 may be separate components within the same physical device frame.

The host device 110 receives image source data 101 from an image source (not shown for simplicity) and renders the image source data 101 for display (e.g., as display data 102) on the HMD device 120. In some embodiments, the host device 110 may include a rendering engine 112 configured to process the image source data 101 according to one or more capabilities of the HMD device 120. For example, in some aspects, the HMD device 120 may display a dynamically-updated image to a user based on the user's head and/or eye position. More specifically, the HMD device 120 may track the user's head and eye movements to display a portion of the image, coinciding with a fixation point of the user (e.g., foveal region), with higher resolution than the remainder of the image (e.g., the full-frame image). Thus, in some embodiments, the rendering engine 112 may generate a high-resolution foveal image to be overlaid in the foveal region of the full-frame image. In some other embodiments, the rendering engine 112 may generate the full-frame image at a lower resolution than a corresponding display resolution of the HMD device 120. For example, in some aspects, the rendering engine 112 may generate the full-frame image and the foveal image with the same resolution (e.g., the same amount of pixel data).

The HMD device 120 receives the display data 102 from the host device 110 and displays a corresponding image to the user based on the received display data 102. In some embodiments, the HMD device 120 may include a display 122 and a backlight 124. The display 122 may be a liquid-crystal display (LCD) panel formed from an array of pixel elements (e.g., liquid crystal cells) configured to allow varying amounts of light to pass from one surface of the display panel to another (e.g., depending on a voltage or electric field applied to each pixel element). For example, the HMD device 120 may apply an appropriate voltage to each of the pixel elements to render a combined image, which includes the foveal image overlaid upon the full-frame image, on the display 122. It is noted that LCDs do not emit light and therefore rely on a separate light source to illuminate the pixel elements so that the image is viewable by the user.

The backlight 124 may be positioned adjacent (e.g., behind) the display 122 to illuminate the pixel elements. The backlight 124 may comprise one or more light sources including, but not limited to, cold cathode fluorescent lamps (CCFLs), external electrode fluorescent lamps (EEFLs), hot-cathode fluorescent lamps (HCFLs), flat fluorescent lamps (FFLs), light-emitting diodes (LEDs), or any combination thereof. In some aspects, the backlight 124 may include an array of discrete light sources (such as LEDs) that can provide different levels of illumination to different regions of the display 122. In some embodiments, the HMD device 120 may include an inverter (not shown for simplicity) that can dynamically alter the intensity or brightness of the backlight 124, for example, to enhance image quality and/or conserve power.

As described above, the communication link 105 between the host device 110 and the HMD device 120 may have a limited bandwidth. It may therefore be difficult to send full-resolution images to the HMD device 120 (e.g., upscaled to the display resolution of the HMD device 120) at the high framerates necessary for a smooth virtual-reality experience. Thus, in some embodiments, the host device 110 may transmit the foveal image and the full-frame image (e.g., without upscaling), as separate component images, to the HMD device 120. The HMD device 120 may then upscale the full-frame image and combine the foveal image at the time of display. It is noted that, prior to upscaling, the full-frame image may have the same overall resolution (e.g., the same amount of pixel data) as the foveal image, and is typically upscaled to a resolution that is several (e.g., four) times greater than the resolution of the foveal image at the time of display. Thus, by transmitting each of the full-frame image and the foveal image in its component form, the system 100 may significantly reduce the load on the communication link 105.

Figure 2:
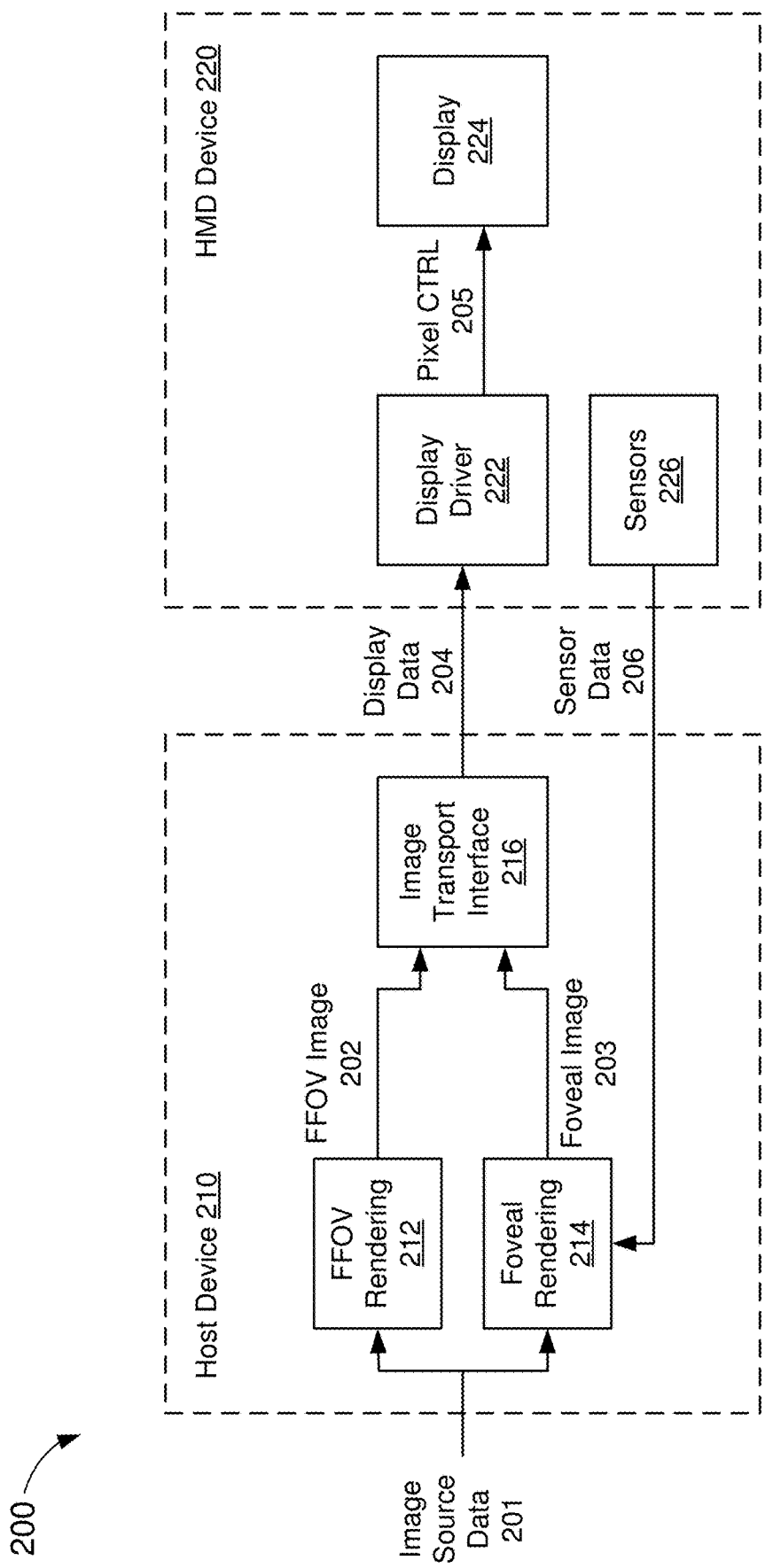
FIG. 2 shows a block diagram of an example display system, in accordance with some embodiments.

FIG. 2 shows a block diagram of an example display system 200, in accordance with some embodiments. The display system 200 includes a host device 210 and an HMD device 220. The display system 200 may be an example embodiment of the display system 100 of FIG. 1. Thus, in some aspects, the host device 210 may be coupled to (and communicate with) components of the HMD device 220 via a communication link (e.g., various wired and/or wireless interconnection and communication technologies, such as buses and networks).

The host device 210 receives image source data 201 from an image source (not shown for simplicity) and renders the image source data 201 for display (e.g., as display data 204) on the HMD device 220. In some embodiments, the host device 210 may dynamically render the image source data 201 based on a user's eye and/or head movements while operating the HMD device 220. For example, the HMD device 220 may include one or more sensors 226 configured to track the user's head and/or eye position. Sensor data 206 describing the user's head and/or eye position may be fed back to the host device 210 (e.g., via the communication link). In some embodiments, the host device 210 may render a portion of the image coinciding with a fixation point of the user (e.g., foveal region) with higher resolution than other regions of the image (e.g., the full-frame image). The overall resolution of the image may depend on prior rendering, storage requirements, and/or the resolution of the display in the HMD device 220.

Figure 3:
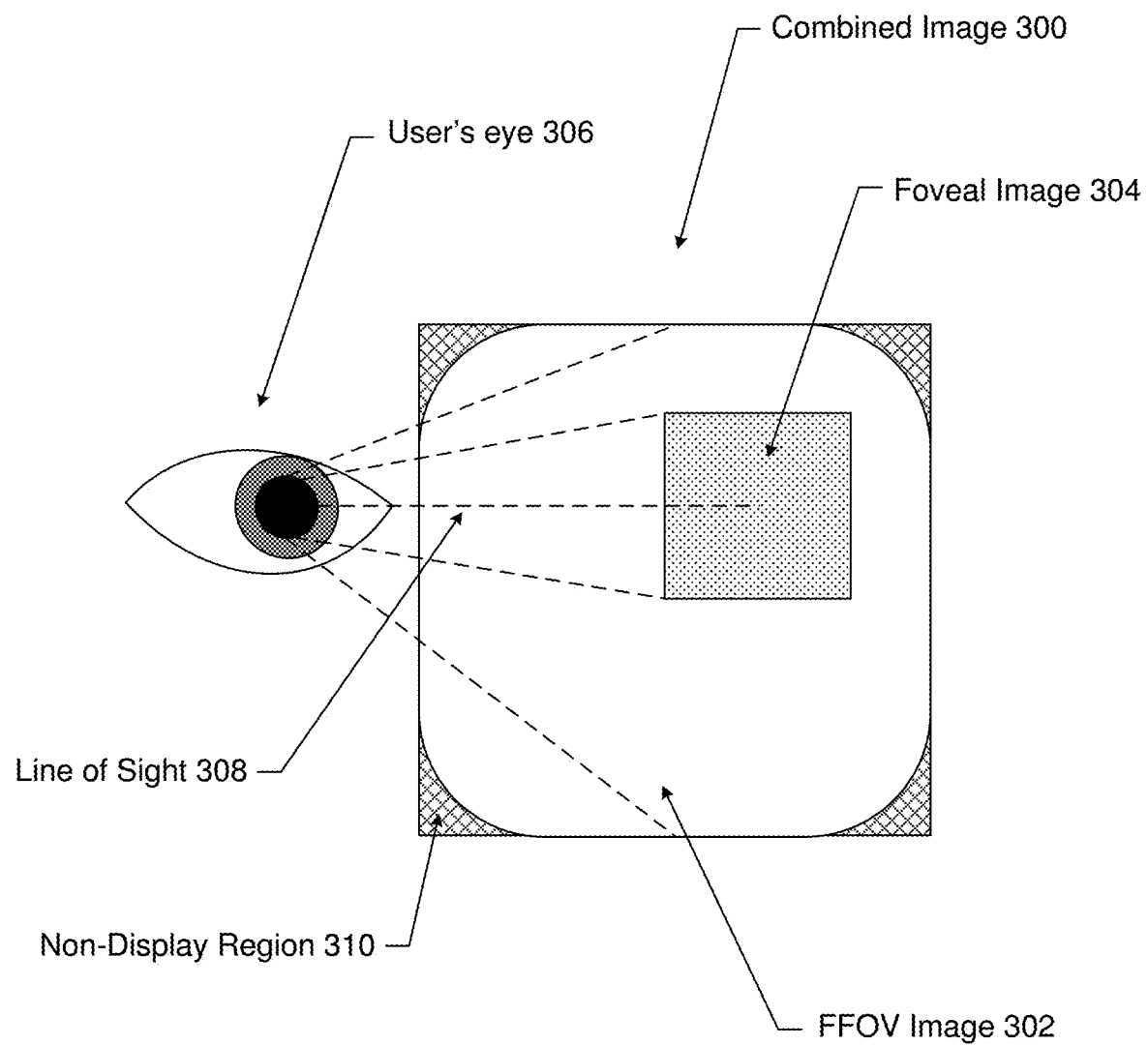
FIG. 3 shows an example image that may be displayed on a head-mounted display (HMD) device, in accordance with some embodiments.

FIG. 3 shows an example combined image 300 that can be displayed on the HMD device 220. The combined image 300 is shown to include a foveal image 304 merged with a full field-of-view (FFOV) image 302. In some aspects, the combined image 300 may be displayed to both of the user's eyes (e.g., on a single display panel or surface of the HMD device 220). In other aspects, variations of the combined image 300 may be displayed to different eyes (e.g., using multiple display panels or surfaces of the HMD device 220).

The FFOV image 302 spans the periphery of the user's line of sight 308. Thus, the FFOV image 302 may correspond with the full-frame image to be displayed across most (if not all) of the display region of the HMD device 220. For example, in a virtual reality environment, the FFOV image 302 may show the extent of the observable virtual or real world that is seen by the user's eyes at any given moment. In contrast, the foveal image 304 spans only the foveal region of the user's line of sight 308. The foveal region may correspond to the portion of the combined image 300 that is viewable by the fovea centralis portion of the user's eye (e.g., the region in which the user is determined to have maximal visual acuity at any given moment). In some embodiments, the foveal image 304 may span a region larger than the actual foveal region of the user's line of sight 308 to compensate for errors and/or delays in eye tracking.

As shown in FIG. 3, the foveal image 304 may encompass a relatively small portion of the combined image 300 compared to the FFOV image 302. More specifically, when generating the combined image 300, the foveal image 304 may be overlaid upon a portion of the FFOV image 302 (e.g., coinciding with the foveal region of the user's line of sight 308). Because the foveal image 304 spans a region in which the user has maximal visual acuity, the foveal image 304 may be rendered at a higher resolution than the corresponding foveal region of the FFOV image 302. Accordingly, the foveal image 304 may appear sharper than the surrounding regions of the FFOV image 302 in the combined image 300.

In some embodiments, the foveal image 304 may have a uniform resolution throughout. In other embodiments, the foveal image 304 may have a resolution that is scaled at the edges. For example, the central portion of the foveal image 304 may be rendered at a higher resolution than the outer portions (e.g., edges) of the foveal image 304. Furthermore, the edges and/or border regions of the foveal image 304 may be blended into the surrounding portions of the FFOV image 302 when generating the combined image 300. For example, the blending may create a smoother or more natural boundary where the edges of the foveal image 304 intersect the FFOV image 302.

Referring back to FIG. 2, the host device 210 may include a full field-of-view (FFOV) rendering engine 212, a foveal rendering engine 214, and an image transport interface 216. The FFOV rendering engine 212 is configured to generate an FFOV image 202 (such as the FFOV image 302 of FIG. 3) based on the image source data 201. For example, the FFOV image 202 may correspond with a full-frame image to be displayed across most (if not all) of the display are of the HMD device 220. In some aspects, the FFOV rendering engine 212 may generate the FFOV image 202 based on a user's head position and/or movement (e.g., as determined based on sensor data 206 received from the sensors 226 of the HMD device 220). Since the FFOV image 202 may span the periphery of the user's line of sight, the FFOV rendering engine 212 may render the FFOV image 202 at a relatively low resolution (e.g., a fraction of the maximum resolution of the image source data 201 and/or HMD device 220) to conserve bandwidth.

The foveal rendering engine 214 is configured to generate a foveal image 203 (such as the foveal image 304 of FIG. 3) based on the image source data 201. For example, the foveal image 203 may span only the foveal region of the user's line of sight. Since the foveal region may correspond to the region in which the user is determined to have maximal visual acuity, the foveal rendering engine 214 may render the foveal image 203 at a relatively high resolution (e.g., the maximum resolution of the image source data 201 and/or HMD device 220). In some embodiments, the foveal rendering engine 214 may generate the foveal image 203 based on the sensor data 206 received from the sensors 226 of the HMD device 220. For example, the sensors 226 may track the position of the user's eyes or gaze while operating the HMD device 220 (e.g., to determine the user's line of sight). Accordingly, the foveal rendering engine 214 may identify the foveal region of the FFOV image 202 based, at least in part, on the sensor data 206 received from the sensors 226 of the HMD device.

In some embodiments, the foveal image 203 may be configured to span a region larger than the actual foveal region of the user's line of sight. The additional area of the foveal image 203 may compensate for errors and/or delays in eye tracking. In some embodiments, the foveal image 203 may have a uniform resolution throughout. In other embodiments, the foveal image 203 may have a resolution that is scaled at the edges to blend in with the surrounding regions of the FFOV image 202 (e.g., when foveal image 203 is merged with the FFOV image 202 to generate a combined image).

The image transport interface 216 is configured to combine the outputs of the FFOV rendering engine 212 and the foveal rendering engine 314 into a single frame of display data 204 to be transmitted to the HMD device 220. For example, the image transport interface 216 may encode and/or compress the FFOV image 202 and the foveal image 203 for transmission over the communication link (which may be a wired or wireless communication medium). In some embodiments, the image transport interface 216 may concatenate the FFOV image 202 with the foveal image 203 as a single frame buffer image prior to transmission. For example, the image transport interface 216 may generate the frame buffer image by appending the FFOV image 202 to the end of the foveal image 203. In this manner, each of the FFOV image 202 and the foveal image 203 may be transmitted, in its entirety (and without upscaling), to the HMD device 220.

In some embodiments, because the FFOV image 202 and the foveal image 203 are transmitted disjointly (e.g., not as a combined/merged image), the image transport interface 216 may further encode a coordinate of the foveal region within the FFOV image 202 (e.g., indicating the region in which the foveal image 203 is to be overlaid on the upscaled FFOV image) in the display data 204 sent to the HMD device 220. The location of the foveal region may be determined by the foveal rendering engine 214 (e.g., during the process of generating the foveal image 203). Thus, in some embodiments, the foveal rendering engine 214 may provide the coordinate of the foveal region, together with the foveal image 203, to the image transport interface 216. In other embodiments, the image transport interface 216 may detect the coordinate of the foveal region by comparing the FFOV image 202 and the foveal image 203.

Transmitting the FFOV image 202 and the foveal image 203 as separate component images (e.g., rather than a single combined image) may reduce the bandwidth and/or frequency of communications between the host device 310 and HMD device 320. For example, because no upscaling is performed on the FFOV image 202 prior to transmission, the FFOV image 202 may have a similar (if not the same) resolution as the foveal image 203 (e.g., the same amount of pixel data is used to transmit each of the FFOV image 202 and the foveal image 203).

With reference for example to FIG. 3, the FFOV image 302 (and combined image 300) may include a number of non-display regions 310. In some aspects, the non-display regions 310 may correspond to unused pixels in the FFOV image 302. For example, the non-display regions 310 may be devoid of pixel data as a result of the optical limitations of a camera lens used to capture the FFOV image 302. In some other aspects, the non-display regions 310 may correspond to portions of the FFOV image 302 that cannot be viewed by the user. For example, the non-display regions 310 may coincide with a curvature of the display and/or regions of the FFOV image 302 that are beyond the periphery of the user's line of sight 308. Aspects of the present disclosure recognize that, because the non-display regions 310 are not displayable by the HMD device 220 and/or viewable by the user, additional pixel data may be encoded therein without interfering with the user's viewing experience. Thus, in some embodiments, the image transport interface 216 may encode the foveal coordinate in one or more non-display regions of the FFOV image 202.

Figure 4:
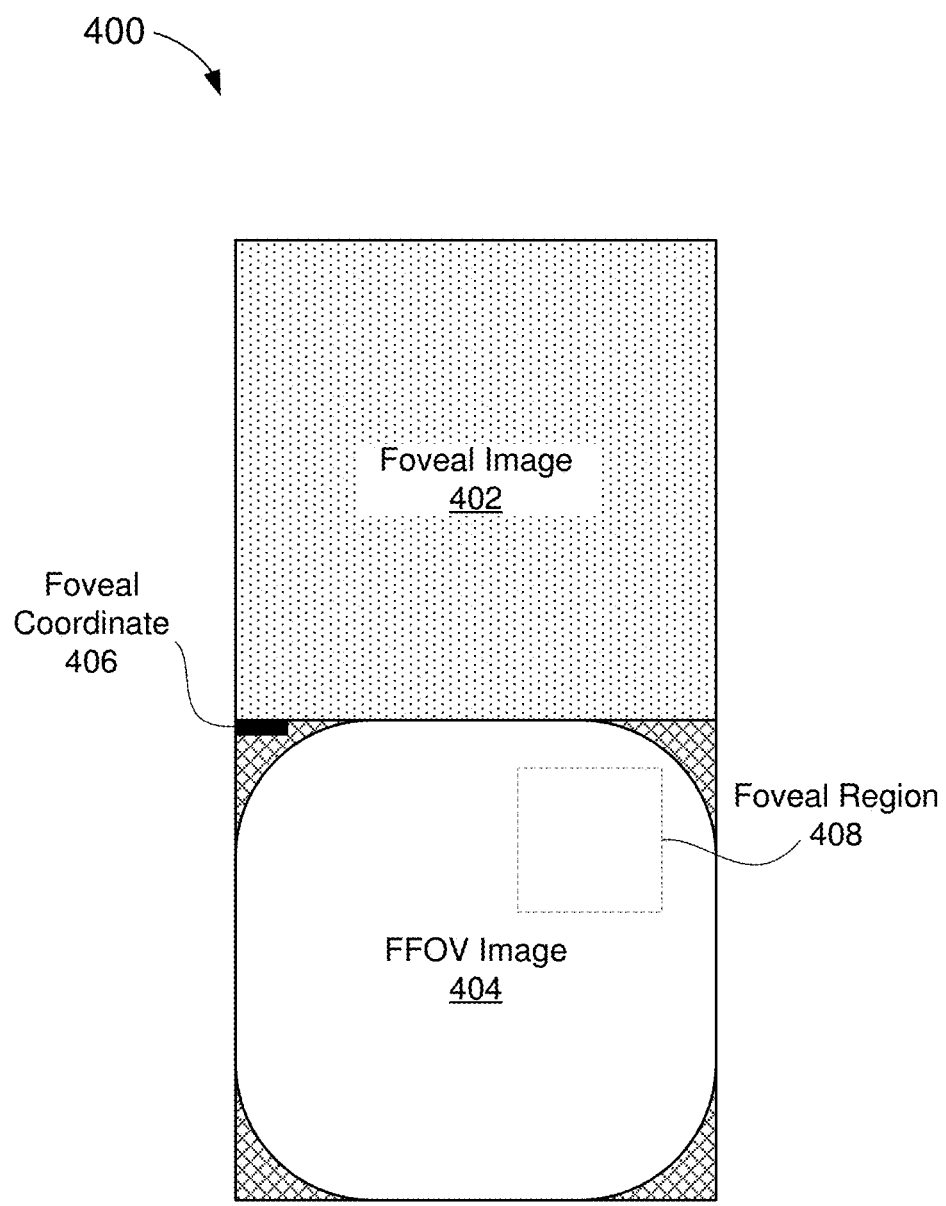
FIG. 4 shows an example frame buffer image with embedded foveal coordinates, in accordance with some embodiments.

As described above, the image transport interface 216 may transmit the FFOV image 202 and the foveal image 203 separately, but in the same frame (e.g., the FFOV image 302 and foveal image 303 are concatenated, and thus adjacent one another, in the same frame buffer image). For example, FIG. 4 shows an example frame buffer image 400 that may be generated by the image transmit module 216 when transmitting the FFOV image 202 and the foveal image 203. When generating the frame buffer image 400, the image transport interface 216 may not upscale the FFOV image 202 to the resolution at which it is to be displayed (e.g., FFOV image 404). Rather, the FFOV image 202 and the foveal image 203 are each transmitted in their "native" resolutions. As a result, the bandwidth needed to transmit the frame buffer image 400 may be substantially less than the bandwidth needed to transmit a corresponding combined image (such as the combined image 300 of FIG. 3). In the example of FIG. 4, the foveal image 203 may be encoded in a first portion of the frame buffer image 400 (e.g., foveal image 402) and the FFOV image 202 may be encoded in a second portion of the frame buffer image 400 (e.g., FFOV image 404). Accordingly, the foveal image 402 and FOV image 404 may be transmitted sequentially (e.g., in the order of encoding), and in their entireties, by the image transport interface 216.

In some embodiments, the image transport interface 216 may further encode a foveal coordinate (or coordinates) 406, in the frame buffer image 400, specifying the foveal region 408 of the FFOV image 404. For example, the foveal coordinate 406 may indicate to the HMD device 220 where to overlay the foveal image 402 with respect to the FFOV image 404 when rendering a combined image on a display (such as the combined image 300 of FIG. 3). In some embodiments, the image transport interface 216 may encode the foveal coordinate 406 in a portion of the frame buffer image 400 coinciding with a non-display region of the FFOV image 404. In the example of FIG. 4, the foveal coordinate 406 is encoded in the upper-left corner of the frame buffer image 400. However, in actual implementations, the foveal coordinate 406 may be encoded in any of the four corners (or other non-display regions) of the FFOV image 404. In some implementations, the foveal coordinate 406 may identify at least one pixel location associated with the foveal region 408 of the FFOV image 404. For example, in some aspects, the foveal coordinate 406 may identify the pixel in a particular corner, or center, of the foveal region 408. In some other aspects, the foveal coordinate 406 may identify a set of pixels defining a boundary of the foveal region.

In some embodiments, the foveal coordinate 406 may be encoded as pixel data. For example, the foveal coordinate 406 may be encoded using the first 32 pixels of the first 2 lines of the frame buffer image 400. In the example of FIG. 4, the foveal coordinate 406 are encoded on the first line of the frame buffer image 400. In some implementations, the image transport interface 216 may encode the foveal coordinate 406 using a 2-bits per pixel sparse encoding technique. For example, bits "00" may be encoded as a black pixel, bits "01" may be encoded as a red pixel, bits "10" may be encoded as a green pixel, and bits "11" may be encoded as a white pixel. The sparse encoding may provide greater robustness against compression and/or other processing along the data path, and may thus allow the foveal coordinate 406 to survive display stream compression (DSC) and/or other compression algorithms.

Referring back to FIG. 2, the HMD device 220 receives the display data 204 from the host device 210 and displays a corresponding image to the user. In some embodiments, the HMD device 220 may include a display driver 222 coupled to a display 224. The display 224 may be a liquid-crystal display (LCD) panel formed from an array of pixel elements (e.g., liquid crystal cells) configured to allow varying amounts of light to pass from one surface of the display panel to another (e.g., depending on a voltage or electric field applied to each pixel element). The display driver 222 may generate one or more pixel control signals 205, based on the received display data 204, to update the pixel elements of the display 224. As described above, the display data 204 may correspond to a frame buffer image in which the FFOV image 202 is encoded separately from the foveal image 203 (e.g., frame buffer image 400 of FIG. 4).

In some embodiments, the display driver 222 may determine how to process the received display data 204 based, at least in part, on the aspect ratio (or display format) of the frame buffer image. For example, if the frame buffer image has a non-standard aspect ratio (such as the frame buffer image 400 of FIG. 4) that does not match the aspect ratio of the display 224 (or a recognized aspect ratio for which images are to be rendered on the display 224), the display driver 222 may determine that the FFOV image 202 and the foveal image 203 are encoded separately (e.g., as shown in FIG. 4). Accordingly, the display driver 222 may parse the FFOV image 202 and the foveal image 203 from the received display data 204 based on their relative positions in the frame buffer image.

The display driver 222 may also identify the coordinate(s) of the foveal region of the FFOV image 202 based on the relative location of the FFOV image 202 and/or foveal image 203 in the received frame buffer image. In the example of FIG. 4, the foveal coordinate 406 is encoded on the first line of pixels of the FFOV image 404 (e.g., just below the foveal image 402 or halfway along the length of the frame buffer image 400). The display driver 222 may then upscale the FFOV image 202 to the resolution at which it is to be rendered on the display 224. Since the foveal image 203 is received in the resolution at which it is to be rendered on the display 224, display driver 222 may merge the foveal image 203 with the FFOV image 202 as an overlay in the foveal region (e.g., using the identified foveal coordinate) to produce a combined image. The display driver 222 may further render the combined image on the display 224 using the pixel control signals 205.

Figure 5:
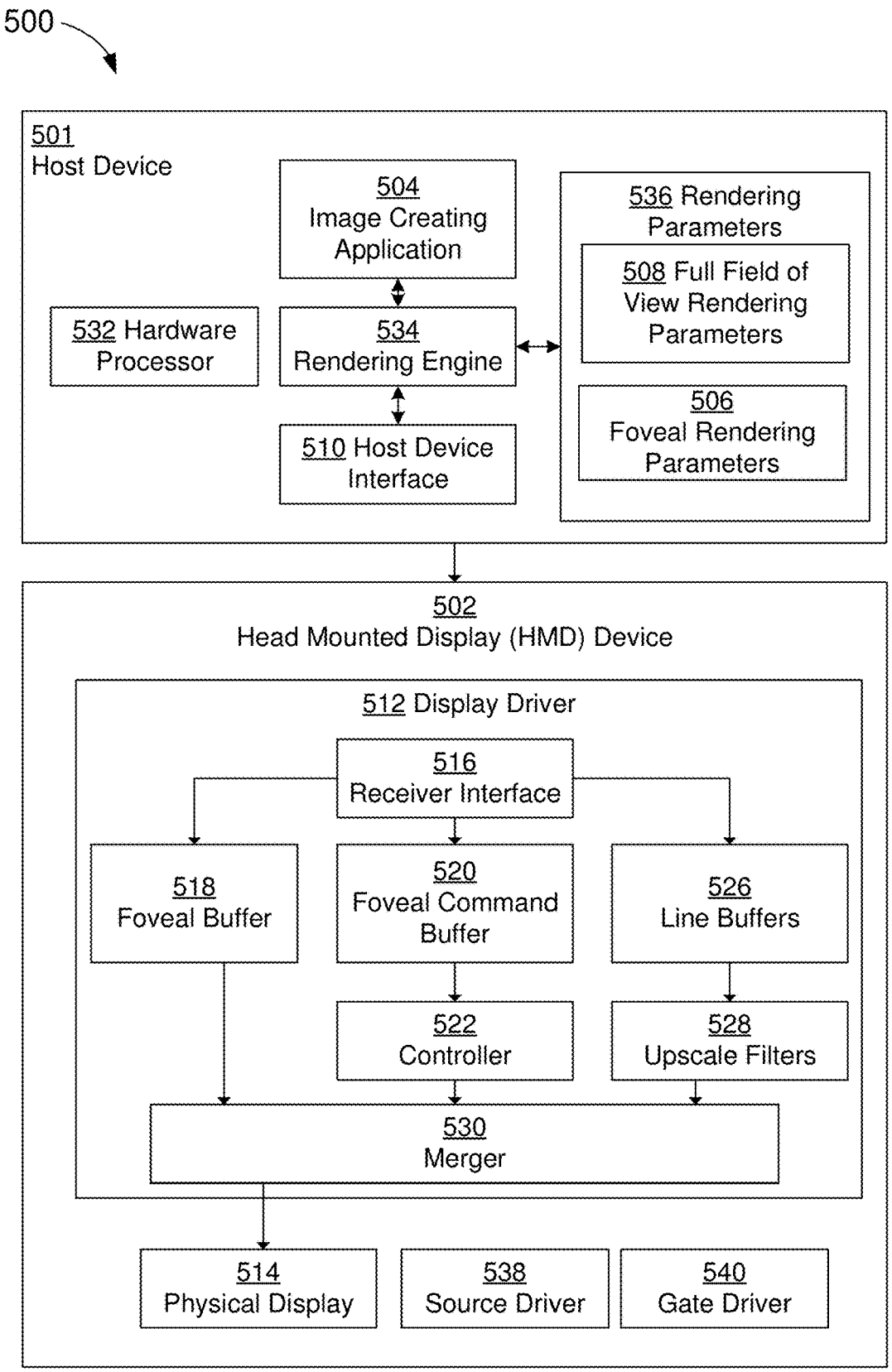
FIG. 5 shows a block diagram of an example display system, in accordance with some other embodiments.

FIG. 5 shows a block diagram of an example display system 500, in accordance with some other embodiments. As shown in FIG. 5, the example system includes a host device 501 and an HMD device 502. The host device 501 may be an example embodiment of the host device 110 of FIG. 1 and/or host device 210 of FIG. 2. The HMD device 502 may be an example embodiment of the HMD device 120 of FIG. 1 and/or HMD device 220 of FIG. 2. Thus, the host device 501 may be coupled to the HMD device 502 via a communication link (e.g., various wired and/or wireless interconnection and communication technologies, such as buses and networks).

The host device 501 may include a hardware processor 532, an image creating application 504, a rendering engine 534, rendering parameters 536, and a host device interface 510. The hardware processor 532 may be any one or more processors configured to execute instructions. For example, the hardware processor 532 may be a central processing unit, a graphics processing unit, an application processor or other processing circuitry.

The image creating application 504 includes functionality to create an image specification. For example, the image creating application 504 may be a software application, such as a virtual reality application, a medical imaging software application, an engineering application or other software application. An image specification describes an image, without having a fixed resolution for the image (e.g., vector graphics). The image specification may describe the image according to polygons of the image.

The image creating application 504 is communicatively coupled to a rendering engine 534. The rendering engine 534 may comprise hardware, software, firmware, or any combination thereof. For example, the rendering engine 534 may be software executing on a physical graphics processing unit. The rendering engine 534 includes functionality to render an image from the image specification using corresponding rendering parameters 536. As shown in FIG. 5, the rendering parameters 536 include foveal rendering parameters 506 and full field of view rendering parameters 508. The foveal rendering parameters 506 specify parameters for rendering the foveal image. For example, the foveal rendering parameters 506 may specify a foveal region in the image, the resolution for the foveal image, and other aspects of the foveal image. The foveal region may be specified in the foveal rendering parameters using line of sight identifier, coordinates, or other identification mechanisms.

In one or more embodiments, the foveal rendering parameters 506 may further specify the filter kernel on the HMD device 502. By specifying the filter kernel, the foveal rendering parameters 506 directly or indirectly identify the amount of upscaling or the final resolution of the FFOV image. Thus, the rendering engine 534 may render the foveal image to blend into the FFOV image. As a result of the blending, the edges of the foveal image may have lower resolution than the center of the foveal image. The blending may be smooth such that the resolution gradually decreases from the center region of the foveal image outward to the edges of the foveal image. The result is that when the images are combined on the HMD device 502, the foveal image blends into the FFOV image such that there are no noticeable edges along the boundary between the foveal region and the peripheral region. Notably, the foveal image is still separate from the FFOV image when transmitted even with the blending by the rendering engine 534.

The full field of view rendering parameters 508 are parameters that specify how to render the FFOV image based on the image specification. In one or more embodiments, the field of view rendering parameters 508 specify a per-pixel resolution that is less than the resolution specified in the foveal rendering parameters 506. For example, the same size space (e.g., dimensional unit) may have less pixel data in the FFOV image than the foveal image. In some embodiments, the FFOV image may have the same dimensions and/or resolution as the foveal image, but after upscaling, the per-pixel resolution of the upscaled FFOV image decreases on the HMD device. For example, the foveal image may have a higher resolution than the corresponding foveal region of the FFOV image.

The host device interface 510 connects the host device 501 to the HMD device 502. The host device interface 510 may be implemented in hardware, software, firmware or a combination thereof. For example, the host device interface 510 may correspond to software or firmware that obtains the foveal image from the rendering engine 534, generates a frame with a corresponding foveal coordinate, and sends the frame to the HMD device 502. The host device interface 510 may further include a hardware port or other connection for communicating with the HMD device 502.

The HMD device 502 is a device worn on a head or part of a helmet that has an optic (e.g., physical display) in front of one or both eyes. The HMD device 502 for both eyes may have one or two individual displays. The HMD device 502 includes a display driver 512, at least one physical display 514, a source driver 538, and a gate driver 540.

The physical display 514 is any type of physical device that includes functionality to show a combined image. For example, the physical display 514 may be a liquid crystal display (LCD), light emitting diode display (LED), micro LED, organic light-emitting diode display (OLED), liquid crystal on silicon (LCos), or other technology. More specifically, the physical display 514 may be formed from an array of pixel elements arranged in rows and columns. Each row of pixel elements is coupled to the gate driver 540 via a respective gate line, and each column of pixel elements is coupled to the source driver 538 via a respective source line. The source driver 538 is configured to drive pixel data, via the source lines, onto the pixel elements of the array. The gate driver 540 is configured to select a particular row of pixel elements to receive the pixel data, for example, by driving the gate line coupled to the selected row. The physical display 514 may be updated by successively "scanning" the rows of pixel elements (e.g., one row at a time), until each row of pixel elements has been updated.

The display driver 512 is configured to obtain a foveal image and a FFOV image from the host device 501, and create a combined image from the foveal image and the FFOV image. The display driver 512 may be implemented in hardware, software, firmware or combination thereof. For example, the display driver 512 may be a driver, a bridge interface circuit, or another part of the HMD device 502. The display driver 512 may include a receiver interface 516, a foveal buffer 518, a foveal command buffer 520, a controller 522, line buffers 526, upscale filters 528, and a merger 530.

The receiver interface 516 connects the HMD device 502 to the host device 501. The receiver interface 516 may be implemented in hardware, software, firmware or a combination thereof. For example, the receiver interface 518 may correspond to software or firmware that obtains the foveal image, command, and the FFOV image from the frame and the host device 501, selects a corresponding component of the display driver 512, and forwards the foveal image, command, and the FFOV image to the corresponding component of the display driver 512. The receiver interface 516 may further include a hardware port or other connection for communicating with the host device 501.

The foveal buffer 518 is connected to the receiver interface 516 and is a storage structure for storing the foveal image. The foveal buffer 518 may correspond to a physical storage or a partition of a physical storage. In one or more embodiments, the foveal buffer 518 has sufficient storage space to store a complete foveal image.

The foveal command buffer 520 is connected to the receiver interface 516 and is a storage structure for storing the at least one coordinate and any command sent with the frame. The foveal command buffer 520 may correspond to a physical storage or a partition of a physical storage.

The controller 522 is connected to the foveal command buffer 520. The controller 522 may be implemented in hardware, software, firmware, or a combination thereof. The controller 522 includes functionality to interpret the coordinate and any command in the foveal command buffer 520 and provide the interpreted coordinate and any command to the merger 530.

The line buffers 526 are coupled to the receiver interface 516 and configured to store the FFOV image, at least in part. The line buffers 526 may correspond to a physical storage or a partition of a physical storage. In one or more embodiments, each line buffer 526 has sufficient storage space to store a line (e.g., a row or a column) of pixels of the FFOV image. A single line buffer may exist to store a single line at a time that is received and processed concurrently. In other embodiments, multiple line buffers exist. The number of line buffers 526 may be dependent on the rate at which lines of the FFOV image is received, and the rate at which lines of the FFOV image are processed from the line buffers 526. In some embodiments, the number of line buffers 526 may correspond to the maximum number of lines in a FFOV image. The line buffers 526 may be configured to store an entire FFOV image as transmitted to the HMD device 502.

The upscale filters 528 are coupled to the line buffers 526. The upscale filters 528 may be implemented in hardware, software, firmware, or any combination thereof. The upscale filters 528 include functionality to process lines of the FFOV image. In particular, the upscale filters 528 include functionality to upscale the FFOV image to a resolution of the physical display 514. Upscaling the FFOV image 528 increases the size of the FFOV image. Thus, the number of pixels of the FFOV image is increased. Because the FFOV image is specified as values for pixels, the upscaling may decrease the perceived image quality of the FFOV image. For example, the sharpness of the FFOV image may decrease.

The merger 530 is coupled to the foveal buffer 518, the controller 522 and the upscale filters 528. The merger 530 may be implemented in hardware, software, firmware, or a combination thereof. The merger 530 includes functionality to generate a combined image from the foveal image and the FFOV image. For example, the merger 530 may include functionality to obtain a coordinate from the controller and overlay the foveal image in the upscaled FFOV image using the coordinate. In one or more embodiments, the merger 530 may further include functionality to blend the foveal image with the FFOV image.

Figure 6A:
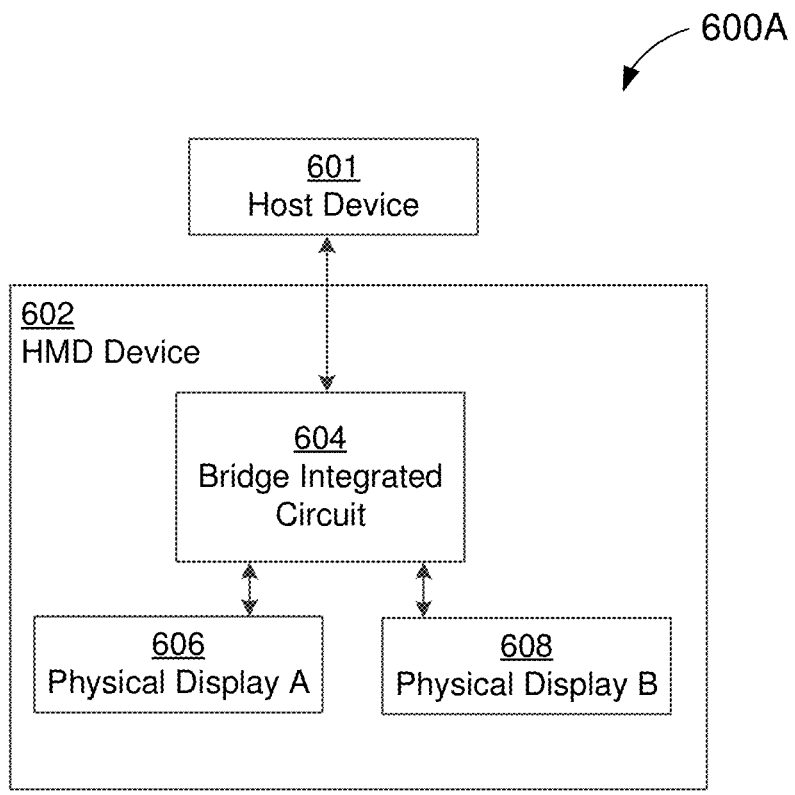
FIGS. 6A and 6B show example display systems that include an HMD device with multiple displays, in accordance with some embodiments.

FIG. 6A is a block diagram of an example display system 600A that includes an HMD device 602 with multiple displays, in accordance with some embodiments. The system 600A includes a host device 601 and the HMD device 602. The display system 600A may be an example embodiment of the display system 500 of FIG. 5, display system 200 of FIG. 2, and/or display system 100 of FIG. 1.

The HMD device 602 includes a bridge integrated circuit 604 and two physical displays (e.g., physical display A 606 and physical display B 608). The host device 601 may be the same as or similar to the host device 501 of FIG. 5. The bridge integrated circuit 604 in FIG. 6A may be the same as or similar to the display driver 512 of FIG. 5. In particular, the bridge integrated circuit 604 of FIG. 6A may include the components and/or functionality of the display driver 512 discussed above with reference to FIG. 5. Rather than a single physical display, the bridge integrated circuit 604 includes functionality to support at least two physical displays (e.g., physical display A 606 and physical display B 608), one for each of the user's eyes. The bridge integrated circuit 604 may receive, for each physical display 606 and 608, an individual foveal image and FFOV image. The bridge integrated circuit 604 of FIG. 6A includes functionality to generate, individually for each physical display 606 and 608, a combined image from the foveal image and the FFOV image. The bridge integrated circuit 604 may include the components discussed above with reference to FIGS. 2-5 to generate combined images from the foveal image and FFOV image.

Figure 6B:
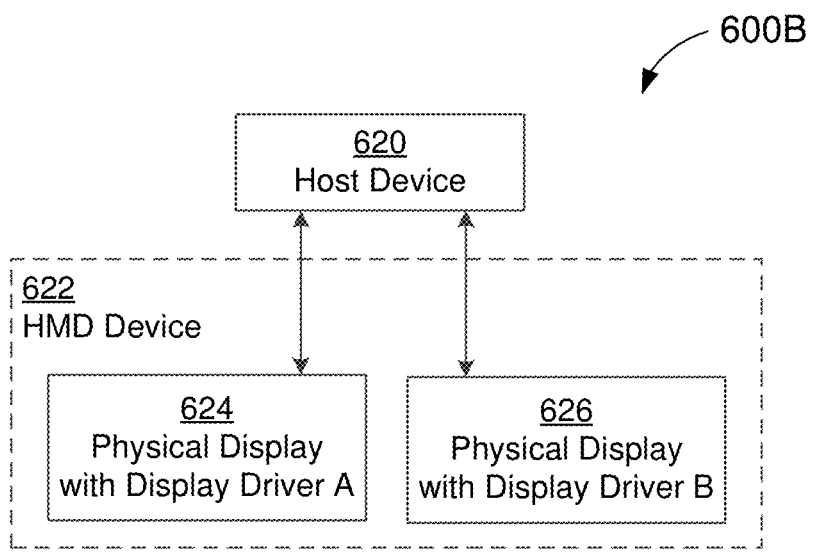

FIG. 6B is a block diagram of an example display system 600B that includes an HMD device 622 with multiple displays, in accordance with some other embodiments. The system 600B includes a host device 620 and the HMD device 622. The display system 600B may be an example embodiment of the display system 500 of FIG. 5, display system 200 of FIG. 2, and/or display system 100 of FIG. 1.

The host device 620 is directly coupled to multiple physical displays with corresponding device drivers (e.g., physical display with device driver A 624, physical display with device driver B 626). Together, physical displays with corresponding device drivers (e.g., physical display with device driver A 624 and physical display with device driver B 626) form the HMD device 622. The HMD device 622 may or may not have housing or other physical and/or virtual components beyond what is shown in FIG. 6B. In some implementations, the display drivers may be the same as, or similar to, the display driver 512 of FIG. 5. In particular, each of the device drivers may include the components and/or functionality of the display driver 512 discussed above with reference to FIG. 5. Each physical display and corresponding device driver (e.g., physical display with device driver A 624 and physical display with device driver B 626) may separately receive an individual foveal image and an individual FFOV image for the physical combined image.

Figure 7:
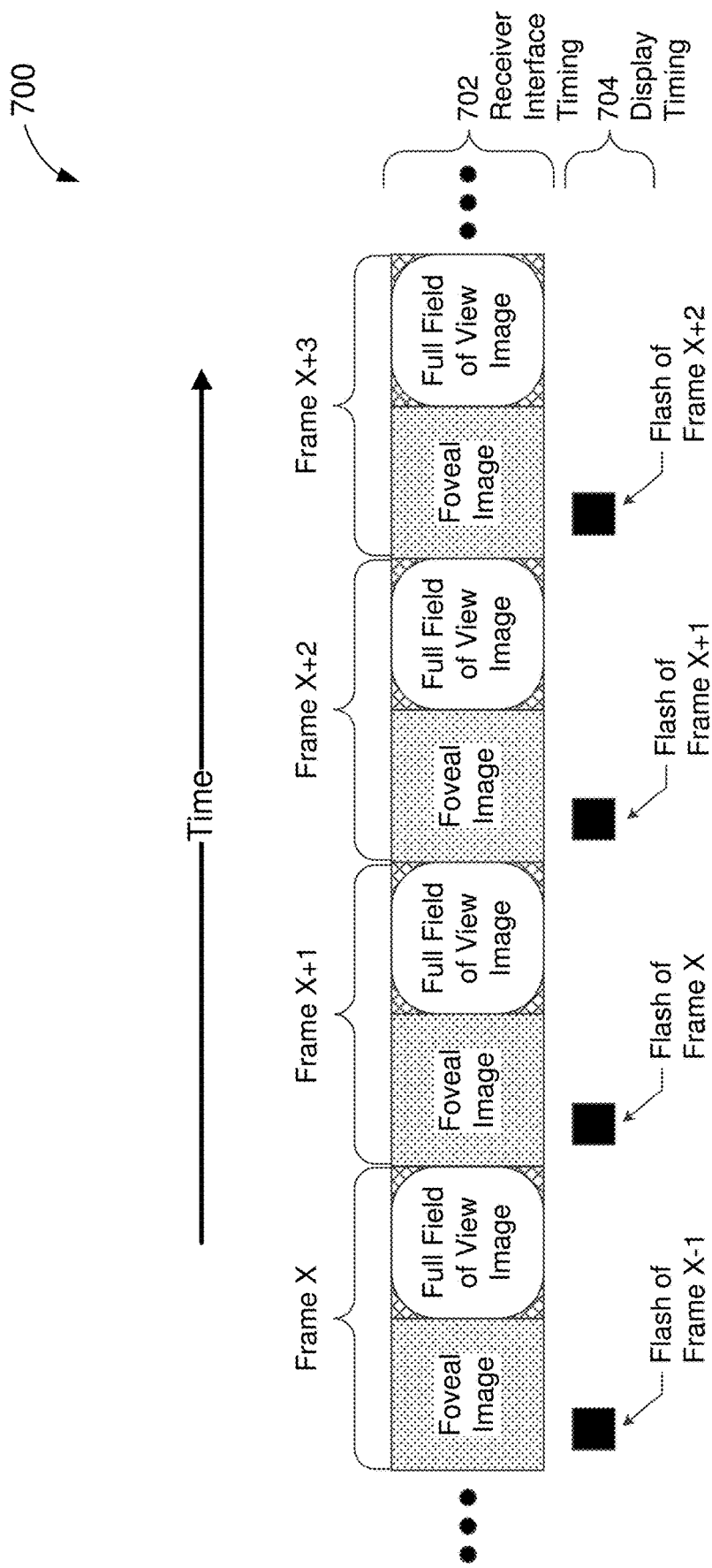
FIG. 7 is a timing diagram depicting a sequence of consecutive frame buffer images, in accordance with some embodiments.

FIG. 7 is a timing diagram 700 depicting a sequence of consecutive frame buffer images, in accordance with some embodiments. In the timing diagram 700, time is shown as increasing from left to right as denoted by the arrow. Further, a receiver interface timing 702 is shown in parallel with a display timing 704. Events that are vertically adjacent between the receiver interface timing 702 and the display timing 704 occur concurrently in one or more embodiments. The receiver interface timing 702 shows the order in which the images in the frames are received and processed. The display timing 704 shows the times at which the combined image for the frame is processed.

In the example of FIG. 7, each frame (e.g., frame X, frame X+1, frame X+2, and frame X+3) has a foveal image that is transmitted prior to the corresponding FFOV image of the frame. Further, although not shown, the coordinate may be transmitted within the first few lines of the foveal image. In embodiments in which the foveal image is not upscaled while the FFOV image is upscaled, by transmitting the foveal image first and the coordinate early, the foveal image may be immediately merged with the corresponding foveal region of the FFOV image as upscaling of the parts of the FFOV image is complete. In another embodiment, the coordinate may be transmitted in the unused pixels of the FFOV image.

Further, as shown in FIG. 7, while the foveal image is being received and stored in the foveal buffer, the combined image from the prior frame is flashed on the physical display as shown by a flash of frame in the display timing (e.g., flash of frame X−1, flash of frame X, flash of frame X+1, flash of frame X+2). In one or more embodiments, the image may be displayed for only a short time by flashing or blinking the physical display (e.g., by flashing backlight or illuminating light emitting diodes of the physical display, during the foveal update time while the foveal image is being transmitted), thereby keeping the physical display off while the foveal image is being updated. The flashing in virtual reality applications makes the user believe that the user is actually viewing the real world with the user's eyes. The user's brain simulates the period of transition between images (e.g., similar to the saccadic suppression phenomenon in human visual perception). If a combined image remains on the physical display until the next image is shown may cause the virtual reality to appear choppy and unrealistic.

As the FFOV image is received, the FFOV image is merged with the foveal image to create the combined image. While portions of the combined image are created, the physical display is updated with the newly created portions. The receiving of the FFOV image, upscaling, merging, and updating of pixels may be concurrent. More particularly, because the prior frame is already flashed when the start of the FFOV image is being received, the pixels are available to be updated for the current frame without interrupting the display of the prior image. The flashing may occur after the pixels of the physical display are settled, if needed, based on the display technology. The result may be a reduction in lag time between flashing of combined images.

Figure 8:
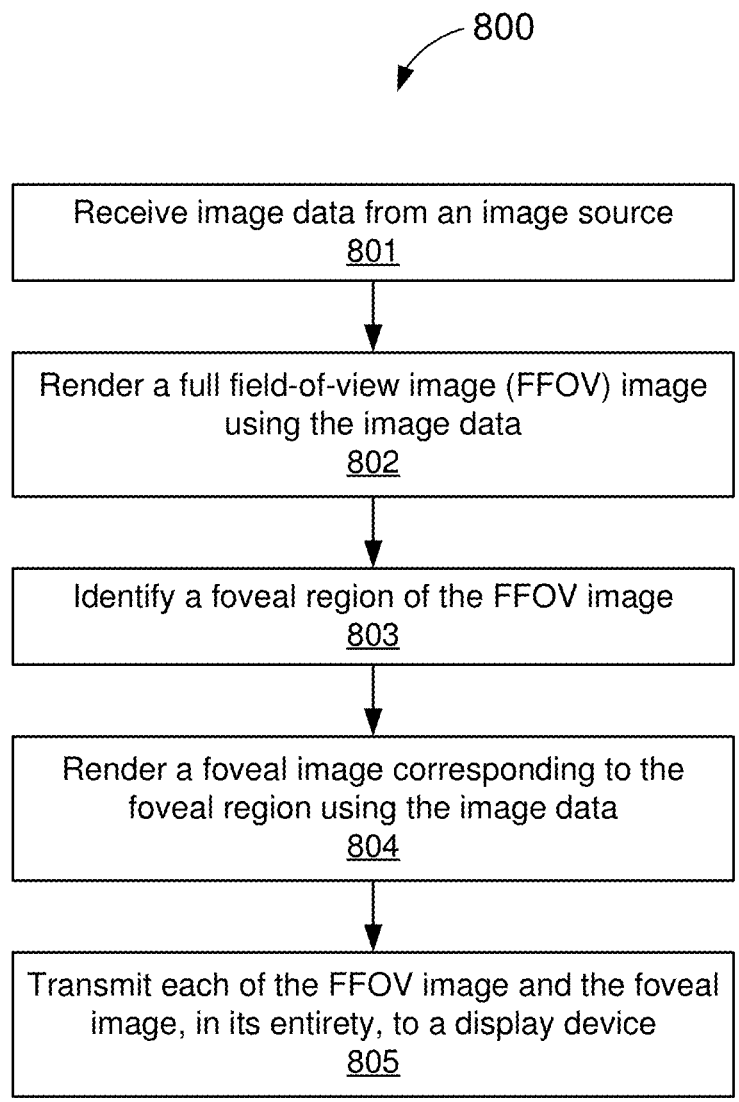
FIG. 8 is an illustrative flowchart depicting an example operation for rendering and transmitting foveal component images.

FIG. 8 is an illustrative flowchart depicting an example operation 800 for rendering and transmitting foveal component images. With reference for example to FIGS. 1, 2, 5, 6A and 6B, the operation 800 may be performed by any host device of the present disclosure.

The host device first receives image data from an image source (801). In some embodiments, the image data may correspond to an image specification that describes an image without specifying a fixed resolution for the image (e.g., vector graphics). For example, the image specification may describe the image according to polygons of the image. In other embodiments, the image data may correspond to pixel data having a resolution that is substantially equal to or greater than the display resolution of a corresponding display device.

The host device may render a field-of-view (FFOV) image using the image data (802). For example, the FFOV image may correspond with a full-frame image to be displayed across most (if not all) of the display area of the corresponding display device. In some embodiments, the host device may generate the FFOV image based on a user's head position and/or movement (e.g., as determined based on sensor data received from the corresponding display device). Since the FFOV image may span the periphery of the user's line of sight, the FFOV image may be rendered at a relatively low resolution (e.g., a fraction of the maximum resolution of the image source data and/or the corresponding display device).

The host device may further identify a foveal region of the FFOV image (803). For example, the foveal region may correspond to the region in which the user is determined to have maximal visual acuity (e.g., coinciding with the fovea centralis portion of the user's eye). In some embodiments, the host device may identify the foveal region of the FFOV image based on sensor data received from the corresponding display device. For example, the sensors may track the position of the user's eyes or gaze while operating the display device (e.g., to determine the user's line of sight).

The host device may then render a foveal image corresponding to the foveal region using the image data (804). For example, the foveal image may span only the foveal region of the user's line of sight. Since the foveal region may correspond to the region in which the user is determined to have maximal visual acuity, the host device may render the foveal image at a relatively high resolution (e.g., the maximum resolution of the image source data and/or the maximum display resolution of the corresponding display device). In some embodiments, the foveal image may be rendered at a higher resolution than the corresponding foveal region of the FOV image.

Finally, the host device may transmit each of the foveal image and the FFOV image, in its entirety, to a display device (805). In some embodiments, the FFOV image may be concatenated with the foveal image to produce a single frame buffer image prior to transmission. As shown in FIG. 4, the frame buffer image may include the foveal image adjacent the FFOV image (in its entirety and without upscaling). Accordingly, the FFOV image and the foveal image may be transmitted disjointly (e.g., not as a combined/merged image) to the corresponding display device. In some embodiments, the host device may further encode a coordinate of the foveal region associated with the FFOV image in the frame buffer image (e.g., as pixel data in a non-display region of the FFOV image) sent to the display device.

Figure 9:
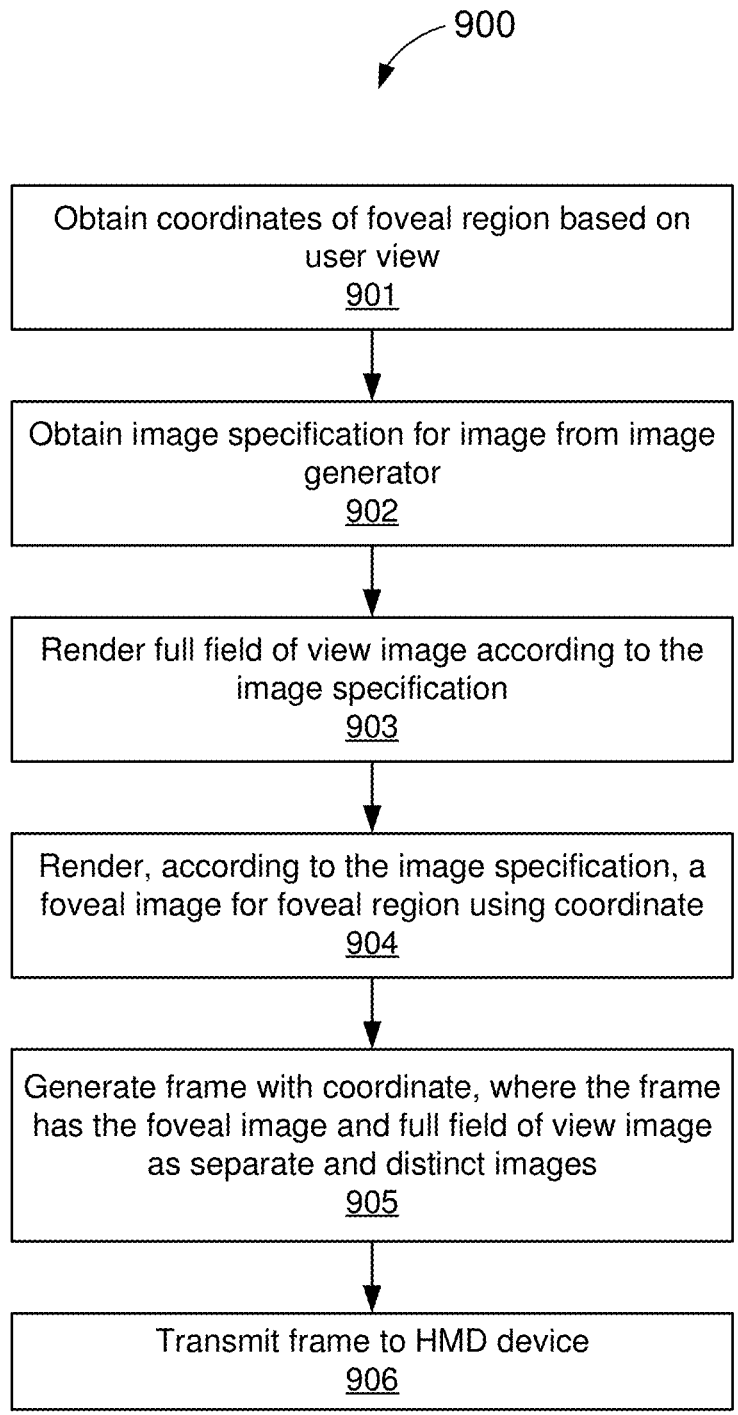
FIG. 9 is an illustrative flowchart depicting a more detailed operation for rendering and transmitting foveal component images.

FIG. 9 is an illustrative flowchart depicting a more detailed operation 900 for rendering and transmitting foveal component images. With reference for example to FIGS. 1, 2, 5, 6A and 6B, the operation 900 may be performed by any host device of the present disclosure.

The host device may first obtain a coordinate of a foveal region based on a user view (901). Obtaining a coordinate from the foveal region may include receiving a coordinate of the line of sight of the user from the HMD device. In particular, a sensor on the HMD device may detect a position of the user's pupil with respect to the display on the HMD device. Other sensors may detect the movement of a user's head, angle, and other information used for virtual reality. In other embodiments, the HMD device may send a coordinate denoting the foveal region.

The host device may further obtain an image specification from an image creating application (902). For example, the image creating application may use information about the user's head position to create an image specification that defines the full field of view of the user.

The host device may then render a full field of view image according to the image specification and the full field of view rendering parameters (903). The full field of view image may be rendered according to the pre-specified resolution for the combined image outside of the foveal region. For example, the pre-specified resolution may account for the rendering time limits and limits on bandwidth. The pre-specified resolution accounts for the later upscaling of the full field of view image on the HMD device. The full field of view image, when rendered, from the image specification is clearer, and has fewer pixels than the upscaled version of the full field of view image in accordance with one or more embodiments of the disclosure. Various rendering algorithms may be applied to render the full field of view image.

The host device may render, according to the image specification and the foveal rendering parameters, the foveal image for the foveal region using the coordinates (904). Rendering the foveal image may be performed in a similar manner to rendering the full field of view image. The coordinate is used to define the foveal region. For example, the coordinate may directly identify the foveal region or the host device may calculate the foveal region based on the coordinate. The host device renders the foveal image using the coordinate according to the pre-specified resolution for the foveal region when in the combined image. For example, the host device may render the foveal image at the maximum resolution of the physical display. The pre-specified resolution may be defined in a configuration setting for the foveal renderer.

In one or more embodiments, the host device may render the foveal image to perform blending with the full field of view image. The blending may reduce the appearance of sharp edges between the foveal region and the full field of view region in the combined image. To perform the blending, the host device may receive information that directly or indirectly identifies the amount of upscaling performed on the HMD device. The host device may use the information about the amount of upscaling along with information about the resolution in which the full field of view image is generated to identify the final resolution of the full field of view image in the combined image. The host device may render the foveal image to have a resolution that is decreased around the edges than toward the center of the foveal image. The decrease may be gradual. By have a gradual decrease, a demarcation between the different resolutions may be unidentifiable.

In some embodiments, the blending described above may be performed on the HMD device. Performing the blending on the HMD device may be in addition to or as an alternative to performing the blending on the host device.

The host device then generates a frame, with the coordinate, where the frame has the foveal image and the full field of view image as separate and distinct images (905). For example, the coordinate, foveal image, and full field of view image may be appended to the frame without merging. By way of another example, the coordinate may be encoded in the unused bits (or non-display region) of the full field of view image. The full field of view image (e.g., with the coordinate encoded in the unused bits) may be appended to the end of the foveal image to create the frame.

The coordinate may or may not be processed before adding the coordinate to the frame. For example, the coordinate obtained from the HMD device may directly be added to the frame. By way of another example, a coordinate may be created that directly identifies the foveal region using the coordinate obtained from the HMD device.

Finally, the host device may transmit the frame to the HMD device (906). For example, the transmission may be from the host interface to the receiver interface. The frame may be transmitted over a communication link (e.g., which may be wired or wireless). Because the full field of view image is not upscaled and the foveal image is separate, the amount of data transmitted for the frame is less than if a combined image were transmitted.

Figure 10:
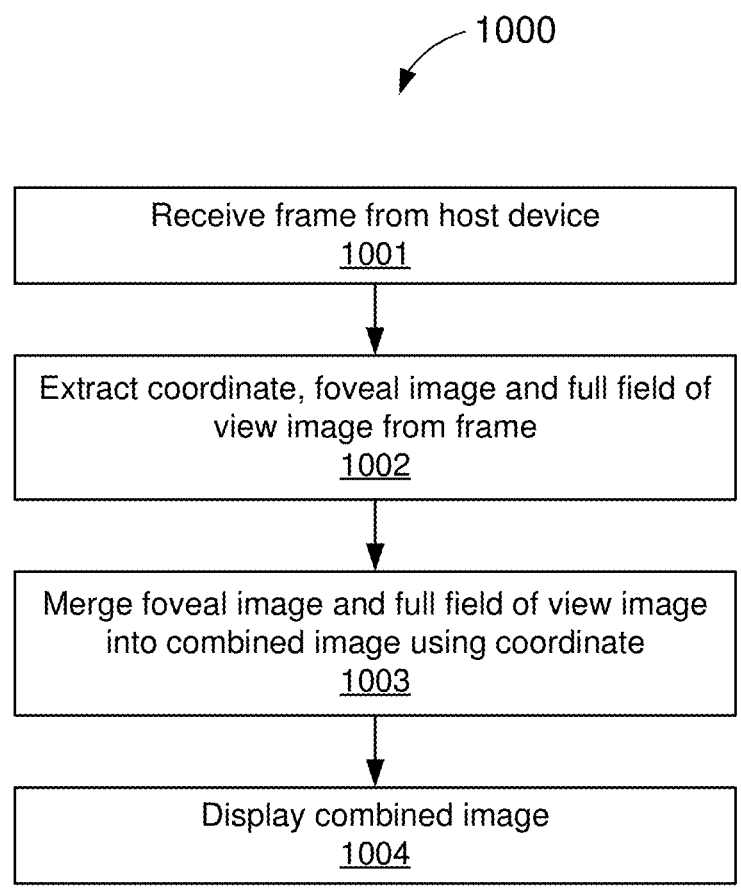
FIG. 10 is an illustrative flowchart depicting an example operation for receiving and displaying foveal component images.

FIG. 10 is an illustrative flowchart depicting an example operation 1000 for receiving and displaying foveal component images. With reference for example to FIGS. 1, 2, 5, 6A and 6B, the operation 1000 may be performed by any HMD device (or other display device) of the present disclosure.

The HMD device first receives a frame from a corresponding host device (1001). For example, the frame may be received via a hardware interface (e.g., communication link) coupling the host device with the HMD device.

The HMD device extracts a coordinate, foveal image, and full field of view image from the received frame (1002). Extracting the coordinate, the foveal image, and/or the full field of view image may be performed using predefined delimiters, such as a series of bits that are embedded in the frame to denote the beginning and/or end of the image or coordinate. By way of another example, extracting the coordinate, the foveal image, and the full field of view image may be based on known locations of the images in the frame. In the example, the first n bits may be preset to be the foveal image, the next x bits may be the coordinate, and the last y bits may be the full field of view image, where n, x, and y are preset positive integers.

The HMD device merges the foveal image with the full field of view image into a combined image using the coordinate (1003). For example, the coordinate may specify a foveal region of the full field of view image. Accordingly, from the coordinate, the corresponding pixels of the full field of view image that are located in the foveal region may be replaced by the foveal image. Thus, the foveal image is overlaid upon the foveal region of the full field of view image. As discussed above, the merging may include blending the foveal image with the full field of view image. The blending at the edges of the foveal image may be performed to soften the change in resolution between the foveal image and the full field of view image. To perform the blending, the resolution of the foveal image along the edges is decreased to gradually match the resolution of the full field of view image.

Finally, the HMD device may display the combined image on a physical display (1004). For example, the physical display 514 may be updated by successively scanning the rows of pixel elements (e.g., one row at a time), until each row of pixel elements has been updated. The storage and pixels of the physical display are updated with the combined image. In some embodiments, the combined image may be presented (e.g., flashed) on the physical display for an amount of time. The amount of time may be brief or for the duration of time between images.

Figure 11:
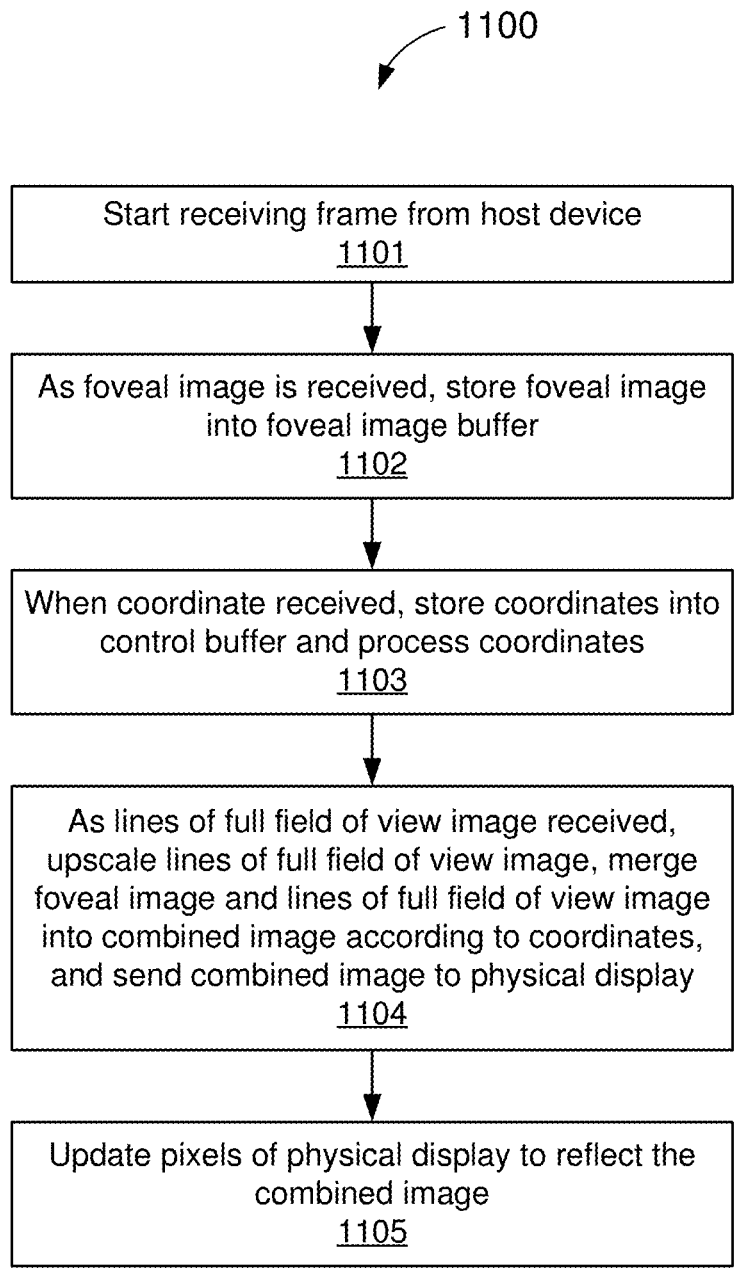
FIG. 11 is an illustrative flowchart depicting a more detailed operation for receiving and displaying foveal component images.

FIG. 11 is an illustrative flowchart depicting a more detailed operation 1100 for receiving and displaying foveal component images. With reference for example to FIGS. 1, 2, 5, 6A and 6B, the operation 1100 may be performed by any HMD device (or other display device) of the present disclosure.

The HMD device starts receiving a frame from the host device (1101). The host device may or may not send a signal to the HMD device that a new frame is being transmitted. For example, the signal may be a predefined sets of bits in a bit stream from the HMD device to the host device.

As the HMD device receives the foveal image, the foveal image may be stored in the foveal image buffer (1102). The receiver interface sends the bits of the foveal image to the foveal image buffer. When the foveal image is received, the foveal image may be at the full resolution of the physical display in some embodiments. In some embodiments, the foveal image may be upscaled for compatibility or to allow for larger error of foveal location estimation.

Upon receiving a coordinate, the HMD device may store the coordinate in the control buffer for further processing (1103). For example, the coordinate may be processed to identify a foveal region of the full field of view image (e.g., the pixels of the full field of view image to be substituted or overlaid by the foveal image).

As the HMD device receives individual lines of the full field of view image, the lines of the full field of view image are upscaled, merged with the foveal image into a combined image according to the coordinates and sent to the physical display (1104). Various techniques may be applied to upscale the full field of view image. Such techniques may include nearest neighbor interpolation, bilinear algorithms, bicubic algorithms, resampling algorithms, interpolation, and other algorithms. The merging replaces the foveal region of the full field of view image with the foveal image. Blending algorithms may be applied at least to the intersection region of the foveal image and the full field of view image to remove a hard edge. Various technique for blending may be applied, such as intermittently using the pixels of one image instead of the pixels of the other image. Another technique may be to set the intersection region of the foveal image as having a certain amount of transparency in order to merge a percentage of the value of the pixel of the full field of view image with a percentage of the value of the corresponding pixel of the foveal image to obtain a value for the corresponding pixel in the combined image.

Finally, the HMD device may update the pixels of the physical display to reflect the combined image (1105). Updating the pixels of the physical display may change the electrical or physical properties of the pixels and is performed according to the type of physical display. For example, the physical display 514 may be updated by successively scanning the rows of pixel elements (e.g., one row at a time), until each row of pixel elements has been updated. In some embodiments, the combined image may be presented (e.g., flashed) on the physical display for an amount of time. The amount of time may be brief or for the duration of time between images.

In FIGS. 8-11, when multiple images are generated for different eyes of the HMD device, the generation, transmission, and display of the two sets of images may be performed concurrently or sequentially. For example, the images may be received concurrently and the corresponding combined images may be flashed concurrently or simultaneously for both eyes. By way of another example, the full field of view image of the first eye may be received concurrently with the foveal image of the second eye. When the foveal image of the second eye is being received, the combined image from the prior frame may be flashed to the second eye. Then, the next foveal image of the first eye may be received while the full field of view image corresponding to the prior foveal image may be received. When the next foveal image of the first eye is received, the combined image for the first eye corresponding to the prior full field of view image may be flashed. The result is a display to each eye sequentially rather than simultaneously or concurrently.

Figure 12A:
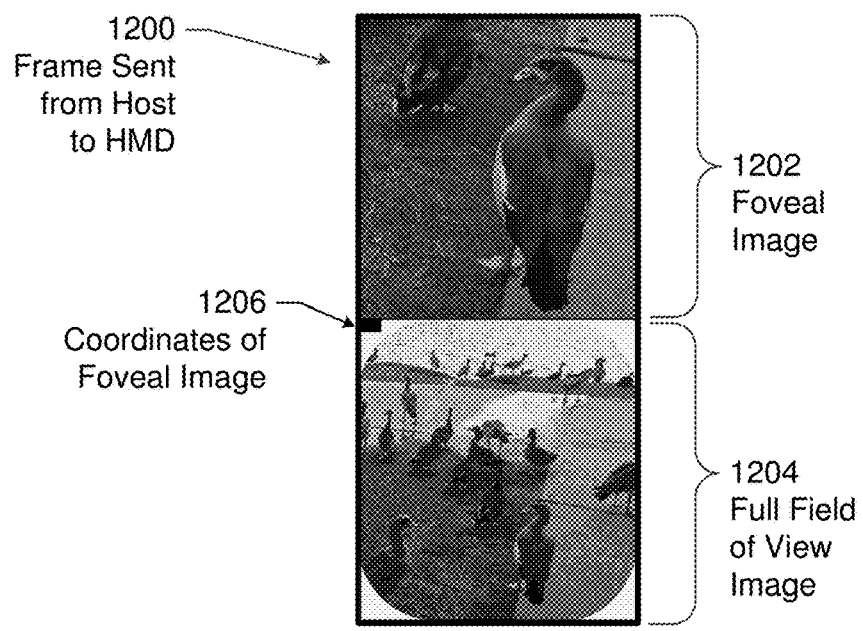
FIG. 12A shows an example rendering of a frame buffer image.
Figure 12B:
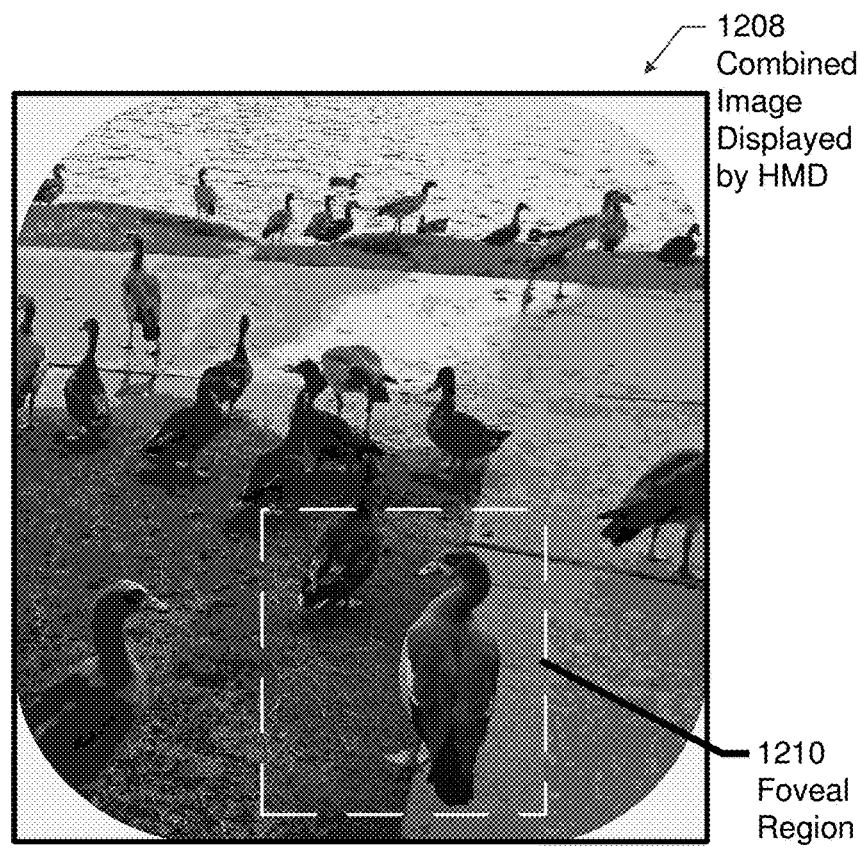
FIG. 12B shows an example rendering of a combined image.

FIGS. 12A and 12B show example renderings of a frame buffer image 1200 and a combined image 1208. The examples for purposes of illustration only, and not intended to limit the scope of the disclosure.

FIG. 12A shows a frame buffer image 1200 that can be transmitted from a host device to an HMD device. The frame buffer image 1200 includes a foveal image 1202 that is separate and distinct from a full field of view image 1204. The frame buffer image 1200 further includes coordinates 1206 identifying a foveal region (e.g., foveal region 1210) of the full field of view image 1204. For the purposes of the example, consider the scenario in which the user is focusing on a particular duck in the user's field of view having multiple ducks. The foveal image 1202 corresponds to the foveal region surrounding the particular duck. The full field of view image 1204 includes the particular duck that the user is focusing on as well as the surrounding area including other ducks that are outside of the foveal region.

The per-pixel resolution of the foveal image 1202 may be higher than that of the foveal region in full field of view image 1204. However, the overall resolution of the full field of view image 1204 may be substantially similar (if not identical) to that of the foveal image 1202. In the example of FIG. 12A, the foveal image 1202 and the full field of view image 1204 in the frame buffer image 1200 have the same resolution (e.g., contain the same amount of pixel data), and are configured such that the foveal image 1202 does not need to be up-scaled when merged into a combined image (such as combined image 1208). As an example, each of the full field of view image 1204 and the foveal image 1202 may have a height of 116 pixels and a width of 106 pixels. Accordingly, the frame buffer image 1200 may have an overall height of 232 pixels and an overall width of 106 pixels.

FIG. 12B shows a resulting combined image 1208 that can be displayed by an HMD device. The combined image 1208 includes the foveal image in the foveal region 1210. In particular, the full field of view image is up-scaled to a display resolution of the HMD device. As a result of the up-scaling, the combined image 1208 may appear less sharp outside of the foveal region 1210. Inside the foveal region 1210, the foveal image is merged with the full field of view image. Although not shown, various blending may be applied to create less of a contrast in resolution. As an example, the combined image may have a height of 288 pixels and a width of 269 pixels. Thus, if the combined image were transmitted from the host device, then 77,472 points need to be sent over the communication link. In contrast, sending the frame buffer image 1200 instead uses less than one third of the bandwidth (e.g., only 24,592 pixels). Thus, aspects of the present disclosure may provide substantial bandwidth usage savings by sending a frame having the foveal image separate from the full field of view image and upscaling the full field of view image on the HMD device. For similar reasons, aspects of the present disclosure may exhibit storage space savings when storing the frame as the frame is being received.

In some embodiments, transmitting the frame having a separate foveal image and full field of view image is used with images that are 2 kilo-pixels (k) by 2 k. In the following example, consider the scenario in which the full field of view image is of size 1024×1024 bytes and the foveal image has the size of 1024×1024 k. On a 2 k×2 k physical display, the foveal image covers one fourth of the physical display, and the accuracy requirement to place the foveal image may be low. On a 3 k×3 k physical display, the foveal image now covers only one ninth of the image, and greater accuracy is used to position to the foveal image in the foveal region 1210. However, with a higher resolution, the display flash is shorter. Further, the frame rate may be increased to maintain brightness. The higher frame rate means reduced foveal latency and better accuracy. On a 8 k×8 k display, the 1 k×1 k foveal region 1210 will only be one sixty-fourth of the physical display. The foveal region 1210 is a little larger than the actual foveal region 1210 and accuracy and frame rate will both be very high.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method comprising:
   receiving image data from an image source;
   rendering a plurality of full field-of-view (FFOV) images based on the image data;
   identifying a respective foveal region in each of the plurality of FFOV images;
   rendering a plurality of foveal images based on the image data, wherein each of the foveal images represents the foveal region of a respective FFOV image, and wherein each of the foveal images has a higher resolution than the foveal region of the FFOV image it represents;
   transmitting, to a display device, a first frame including a first foveal image of the plurality of foveal images and a first FFOV image of the plurality of FFOV images; and
   transmitting, to the display device, a second frame including a second FFOV image of the plurality of FFOV images and a second foveal image of the plurality of foveal images, wherein the first foveal image represents the foveal region of the second FFOV image, and wherein the first foveal image is configured to be displayed concurrently with the second FFOV image on a first display of the display device.

2. The method of claim 1, wherein each foveal image of the plurality of foveal images has a same resolution as and encompasses a smaller display area than the FFOV image it represents.

3. The method of claim 1, wherein the first frame is transmitted at a first time, and wherein the second frame is transmitted at a second time subsequent to the first time.

4. The method of claim 1, wherein the first foveal image is concatenated with the first FFOV image in the first frame, and wherein the second FFOV image is concatenated with the second foveal image in the second frame.

5. The method of claim 1, further comprising:
   transmitting, to the display device, a third frame including a third foveal image of the plurality of foveal images and a third FFOV image of the plurality of FFOV images, wherein the second foveal image represents the foveal region of the third FFOV image.

6. The method of claim 5, wherein the second foveal image is configured to be displayed concurrently with the third FFOV image on a second display of the display device.

7. A device, comprising:
   an input to receive image data from an image source;
   a rendering engine configured to:
      render a plurality of full field-of-view (FFOV) images based on the image data;
      identify a respective foveal region in each of the plurality of FFOV images; and
      render a plurality of foveal images based on the image data, wherein each of the foveal images represents the foveal region of a respective FFOV image, and wherein each of the foveal images has a higher resolution than the foveal region of the FFOV image it represents; and
   an image transport interface configured to:
      transmit, to a display device, a first frame including a first foveal image of the plurality of foveal images and a first FFOV image of the plurality of FFOV images; and
      transmit, to a display device, a second frame including a second FFOV image of the plurality of FFOV images and a second foveal image of the plurality of foveal images, wherein the first foveal image represents the foveal region of the second FFOV image, and wherein the first foveal image is configured to be displayed concurrently with the second FFOV image on a first display of the display device.

8. The device of claim 7, wherein each foveal image of the plurality of foveal images has a same resolution as and encompasses a smaller display area than the FFOV image it represents.

9. The device of claim 7, wherein the first frame is transmitted at a first time, and wherein the second frame is transmitted at a second time subsequent to the first time.

10. The device of claim 7, wherein the first foveal image is concatenated with the first FFOV image in the first frame, and wherein the second FFOV image is concatenated with the second foveal image in the second frame.

11. The device of claim 10, wherein the image transport interface is further configured to:

transmit, to the display device, a third frame including a third foveal image of the plurality of foveal images and a third FFOV image of the plurality of FFOV images, wherein the second foveal image represents the foveal region of the third FFOV image.

12. The device of claim 11, wherein the second foveal image is configured to be displayed concurrently with the third FFOV image on a second display of the display device.

* * * * *